United States Patent
Chuang et al.

(10) Patent No.: US 11,039,147 B2
(45) Date of Patent: Jun. 15, 2021

(54) METHOD AND APPARATUS OF PALETTE MODE CODING FOR COLOUR VIDEO DATA

(71) Applicant: MEDIATEK INC., Hsin-Chu (TW)

(72) Inventors: Tzu-Der Chuang, Zhubei (TW);
Yu-Chen Sun, Keelung (TW); Shan Liu, San Jose, CA (US); Ching-Yeh Chen, Taipei (TW); Yu-Wen Huang, Taipei (TW); Xiaozhong Xu, State College, PA (US); Wang-Lin Lai, San Jose, CA (US); Jing Ye, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 170 days.

(21) Appl. No.: 16/304,207

(22) PCT Filed: May 26, 2017

(86) PCT No.: PCT/CN2017/086066
§ 371 (c)(1),
(2) Date: Nov. 23, 2018

(87) PCT Pub. No.: WO2017/206805
PCT Pub. Date: Dec. 7, 2017

(65) Prior Publication Data
US 2020/0288145 A1 Sep. 10, 2020

Related U.S. Application Data

(60) Provisional application No. 62/449,673, filed on Jan. 24, 2017, provisional application No. 62/342,882, filed on May 28, 2016.

(51) Int. Cl.
| | |
|---|---|
| *H04N 19/157* | (2014.01) |
| *H04N 19/11* | (2014.01) |
| *H04N 19/186* | (2014.01) |
| *H04N 19/129* | (2014.01) |
| *H04N 19/176* | (2014.01) |
| *H04N 19/119* | (2014.01) |

(52) U.S. Cl.
CPC .......... *H04N 19/157* (2014.11); *H04N 19/11* (2014.11); *H04N 19/119* (2014.11);
(Continued)

(58) Field of Classification Search
None
See application file for complete search history.

(56) References Cited

U.S. PATENT DOCUMENTS

| | | |
|---|---|---|
| 7,171,051 B1 | 1/2007 | Moreton et al. |
| 10,841,572 B2 | 11/2020 | Gamei et al. |

(Continued)

FOREIGN PATENT DOCUMENTS

| | | |
|---|---|---|
| CN | 101494782 A | 7/2009 |
| CN | 104255029 A | 12/2014 |

(Continued)

OTHER PUBLICATIONS

International Search Report dated Aug. 18, 2017, issued in application No. PCT/CN2017/086066.

(Continued)

*Primary Examiner* — Christopher G Findley
(74) *Attorney, Agent, or Firm* — McClure, Qualey & Rodack, LLP

(57) ABSTRACT

Methods and apparatus for a coding system using palette mode coding for colour video are disclosed. According to method, when the palette mode is enabled, separate coding of luma and chroma components is disabled or if separate coding of luma and chroma components, the palette mode is disabled. According to another method, when the palette mode is enabled for the current image, palette mode coding is only applied to the luma blocks and non-palette mode coding is applied to the chroma blocks. According to yet another method, palette mode coding is applied to the luma blocks using luma palettes if the palette mode is selected for (Continued)

the luma blocks and palette mode coding applying to the chroma blocks using chroma palettes if the palette mode is selected for the chroma blocks. According to yet another method, the scan direction for a non-square CU depends on the shape of the non-square.

17 Claims, 9 Drawing Sheets

(52) U.S. Cl.
CPC ......... *H04N 19/129* (2014.11); *H04N 19/176* (2014.11); *H04N 19/186* (2014.11)

(56) References Cited

U.S. PATENT DOCUMENTS

| | | |
|---|---|---|
| 2009/0190659 A1 | 7/2009 | Lee et al. |
| 2016/0227245 A1 | 8/2016 | Liu et al. |
| 2016/0316199 A1* | 10/2016 | Chuang ................ H04N 19/157 |
| 2016/0323591 A1* | 11/2016 | Chuang ................ H04N 19/105 |
| 2016/0345014 A1 | 11/2016 | Kim et al. |

FOREIGN PATENT DOCUMENTS

| | | |
|---|---|---|
| CN | 105594211 A | 5/2016 |
| EP | 2858367 A2 | 4/2015 |
| EP | 2858367 A3 | 4/2015 |
| WO | 2015/090217 A1 | 6/2015 |
| WO | 2015/090219 A1 | 6/2015 |
| WO | 2015/094711 A1 | 6/2015 |

OTHER PUBLICATIONS

European Search Report, dated Jul. 17, 2020, of patent application No. 20180787.2-1209.

Chinese language office action dated Nov. 18, 2020, issued in application No. CN 201780030882.8.

* cited by examiner

M/2xM
Symmetric vertical splitting

M/2xM
Symmetric horizontal splitting

M/4xM (L)  M/4xM (R)  MxM/4 (U)  MxM/4 (D)

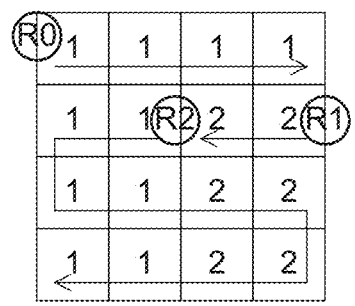
Fig. 7A
| Run Index | Run Mode | Palette Index(derived from palette_index) | palette_index | Run of Pixels(derived from PaletteIndexRun) | PaletteIndexRun |
|---|---|---|---|---|---|
| R0 | Copy Index | 1 | 1 | 4 | 3 |
| R1 | Copy Index | 2 | 1(=2-1) | 2 | 1 |
| R2 | Copy Above | N/A | N/A | 10 | 9 |
Fig. 7B
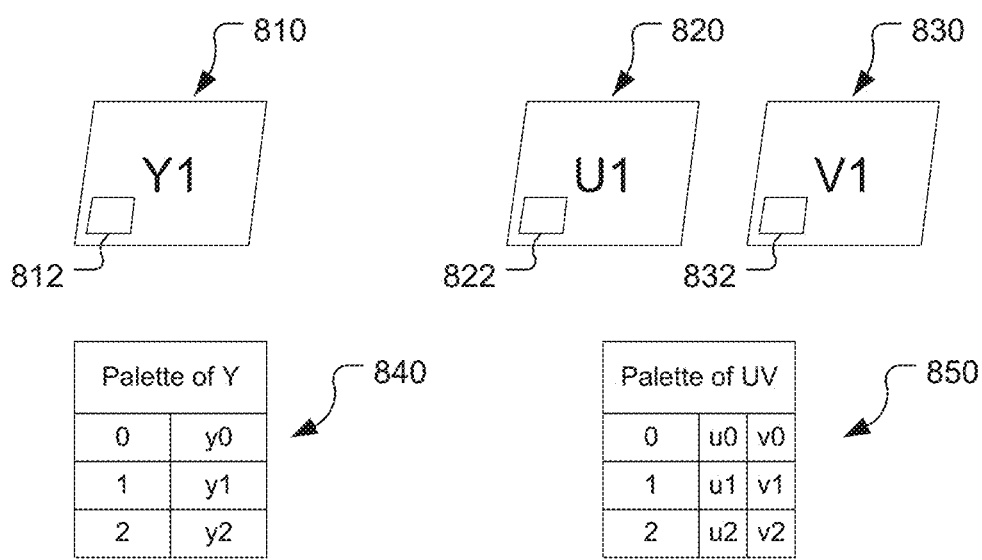
Fig. 8

METHOD AND APPARATUS OF PALETTE MODE CODING FOR COLOUR VIDEO DATA

CROSS REFERENCE TO RELATED APPLICATIONS

The present invention claims priority to U.S. Provisional Patent Application Ser. No. 62/342,882 filed on May 28, 2016. The U.S. Provisional Patent application is hereby incorporated by reference in its entirety.

FIELD OF THE INVENTION

The present invention relates to block partition for coding and/or prediction process in video coding. In particular, the present invention discloses various coding arrangements for a coding system using palette mode coding on video data with luma and chroma components.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a block is firstly partitioned by a quadtree structure and the quadtree splitting can be iterated until the size for a splitting block reaches the minimum allowed quadtree leaf node size. If the leaf quadtree block is not larger than the maximum allowed binary tree root node size, it can be further partitioned by a binary tree structure and the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

The QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

For block-based coding, there is always a need to partition an image into blocks (e.g. CUs, PUs and TUs) for the coding purpose. As known in the field, the image may be divided into smaller images areas, such as slices, tiles, CTU rows or CTUs before applying the block partition. The process to partition an image into blocks for the coding purpose is referred as partitioning the image using a coding unit (CU) structure. The particular partition method to generate CUs, PUs and TUs as adopted by HEVC is an example of the coding unit (CU) structure. The QTBT tree structure is another example of the coding unit (CU) structure.

Palette Coding

Palette mode is designed according to the observation that the pixel values in a screen content frame usually concentrate on few colour values. FIG. 6 shows an example of the palette mode operations, where image area 610 is the input and the histogram 620 of the image area shows sparse intensity levels concentrated at 50, 80 and 210. Accordingly, a palette 630 (also named as a palette table) is generated based on the histogram, where each representative colour value is associated with a colour index (also named as palette index) in the palette table. The image area is then compactly represented as a colour index map 640. The encoder analyses the pixels in a CU and determines several representative colours to construct a palette table; i.e., a colour mapping table between the representative colour values (also named as major colour values) and colour indices. The palette table is signalled in the bitstream. The pixels with the pixel values close to the palette colours are quantized to the palette colours and represented by the corresponding palette indices. The rest of the pixels (i.e., pixels having values not represented in the palette) are called escape pixels. The pixel values of the escape pixels are signalled directly. A special palette index value is reserved to represent the escape pixels. All palette indices in the CU form a palette index map, which is transmitted to the decoder along with the escape pixel values. Note that in FIG. 6, to simplify the illustration, a pixel or a palette index is shown to correspond to only one value. However, in HEVC Screen Content Coding (SCC) Draft, a pixel or a palette index may represent three colour component values (e.g., YCbCr or GBR).

In HEVC SCC palette mode, a flag is transmitted at the CU level to signal whether the palette mode is used. If the palette mode is utilized, pixels in a CU are represented by major colours and escape colours. Major colours are representative colours in the CU. Escape colours are the colours that do not belong to the major colours. Note that a colour is a 3-value (e.g., YCbCr or GBR) vector.

Major colours are described by a palette table, and encoded by palette table coding tools. Based on the palette table, a pixel of three colour components is represented by a palette index. Palette indices of all pixels in a CU form a palette index map and are encoded by palette index map coding tools.

Predictive coding is applied for the palette table. The decoder constructs a palette table predictor to predict the palette table of the current CU. In an early palette table coding method, the predictor is the palette table of the neighbouring CU. However, if the neighbouring CU is not coded in the palette mode, there is no valid predictor and no prediction is applied in this case. As a result, the prediction of the palette table is inefficient. To solve this problem, the palette of the last palette coded CU is used as the predictor. In other words, whether the neighbouring CU is palette coded or not, a CU can always obtain a valid palette predictor. Furthermore, the prediction is found to be inefficient when a large CU uses a palette table of a small CU as palette table predictor because the small CU may contain much fewer colours than a large CU. The palette prediction fails to provide enough colours in the palette table predictor. Accordingly, not only the last coded palette table but also the colours in all previous coded palette tables are used to form a new predictor for the following CUs so that a CU can acquire a palette table predictor with enough colours to perform good prediction.

After the palette table is encoded, the pixels in a CU are represented by palette indices corresponding to the colours in the palette. The indices form an index map and are run-based encoded in horizontal or vertical traverse scan order. FIG. 7A shows an example of the palette index map coding, where the horizontal scan order is assumed. In this example, an index map with 16 indices for 16 pixels is encoded by three runs with horizontal traverse scan. There are two run modes: copy index mode and copy above mode. For each starting position of a run, a flag is transmitted to indicate which run mode is used.

If the copy above mode is used, PaletteIndexRun information to indicate the run length is transmitted. For the mode corresponding to run of pixels, the palette indices are copied from their above pixels, where the run value is derived from PaletteIndexRun. FIG. 7B illustrates an example of index map coding for the example in FIG. 7A. The run corresponding to R2 is a copy above run with a run value equal to 10. Since the run value should be larger than zero, PaletteIndexRun is defined as PaletteIndexRun=run value−1. Thus, PaletteIndexRun values for R0, R1, and R2 are 3, 1 and 9, respectively for the example in FIG. 7B. Also, PaletteIndexRun is coded in separated parts as a prefix syntax element and a suffix syntax element.

If the copy index mode is used, a palette_index_idc syntax element is first signalled, followed by PaletteIndexRun information. A run of pixels shares the same palette index, where the palette index and the run value are derived from the palette_index_idc and PaletteIndexRun, respectively. For the example in FIG. 7A and FIG. 7B, R0 and R1 are two copy index runs, where the corresponding (palette index, run value) are (1, 4) and (2, 2), respectively.

In the current invention, various aspect of palette mode coding for video data using coding unit (CU) structure are addressed.

BRIEF SUMMARY OF THE INVENTION

A method and apparatus for video coding using palette coding mode for colour video comprising a luma component and one or more chroma components are disclosed. According to one method, when a palette mode is enabled for the current image, the luma and chroma components of the current image are partitioned jointly into luma blocks and chroma blocks using a same coding unit (CU) structure and the luma blocks and the chroma blocks are coded jointly if the palette mode is selected for the luma blocks and the chroma blocks. Alternatively, when the luma and chroma components of the current image are partitioned into the luma and chroma blocks separately using separate CU structures, the luma and chroma blocks are encoded or decoded using a coding mode selected from a coding mode group excluding the palette mode. Whether the palette mode is enabled can be indicated by a palette mode enable syntax signalled in a video bitstream at an encoder side or parsed from the video bitstream at a decoder side. The palette mode enable syntax is signalled or parsed at SPS (sequence parameter set), PPS (picture parameter set) or a slice header of the video bitstream.

According to another method, the luma and chroma components of the current image are partitioned into luma blocks and chroma blocks using a coding unit (CU) structure. When the palette mode is enabled for the current image, palette mode coding is only applied to the luma blocks and non-palette mode coding is applied to the chroma blocks. When a chroma block is coded using direct mode (DM) and a corresponding luma block is coded in the palette mode, a pre-defined Intra mode can be used to code the chroma block. The pre-defined Intra mode may correspond to DC mode or planar mode. If a corresponding luma block is coded in the palette mode, a codeword for indicating a coding mode used by a chroma block associated with the corresponding luma block is coded or decoded using a codeword table excluding direct mode (DM).

According to yet another method, the luma component and said one or more chroma components of the current image separately into luma blocks and chroma blocks using separate coding unit (CU) structures. Palette mode coding is applied to the luma blocks using luma palettes if the palette mode is selected for the luma blocks and palette mode coding applying to the chroma blocks using chroma palettes if the palette mode is selected for the chroma blocks. The chroma components may share the same chroma or use separate chroma palettes. Whether a target chroma CU is coded using the palette mode can be determined according to whether one or more collocated luma CUs are coded by the palette mode. For example, if a top-left 4×4 block of the collocated luma block is coded by the palette mode, the target chroma block is coded by the palette mode and otherwise; the target chroma block is not coded by the palette mode. In another example, if any of four corner 4×4 blocks and four middle 4×4 blocks of the collocated luma block is coded by the palette mode, the target chroma block is coded by the palette mode and otherwise, the target chroma block is not coded by the palette mode. Whether a target chroma block is coded using the palette mode can be indicated by signalling in an encoder side or parsing in a decoder side a chroma palette mode syntax. In another embodiment, whether the chroma palette mode syntax for the target chroma block is signalled or parsed conditionally depending on whether a collocated luma block is coded by the palette mode.

In the above method, an initial palette predictor list can be generated at a beginning of a slice, wavefront, or tiles. The initial palette predictor list can be used as initial predictors for the luma blocks or chroma blocks coded in the palette mode. In one embodiment, the initial palette predictor list uses a joint colour component palette, where the luma blocks or chroma blocks coded in the palette mode use corresponding luma component or corresponding one or more chroma components from colour entries of the initial palette predictor list as respective palette predictors. In another embodiment, the initial palette predictor list uses separate initial luma palette for the luma blocks coded in the palette mode and one or more initial chroma palettes for the chroma blocks coded in the palette mode. When the chroma components correspond to a U component and a V component, the chroma blocks for the U component and the chroma blocks for the V component may either share a joint initial chroma palette or use separate initial chroma palettes. When a target chroma block is coded using the palette mode and a collocated luma block is also coded using the palette mode, palette scan direction of the chroma block can be inherited from the palette scan direction of the collocated luma block.

According to yet another method, the current image is partitioned into coding units (CUs) using a coding unit (CU) structure, where at least one CU is non-square. If a palette mode is used for a non-square CU, a scan direction associated with palette coding is determined for the non-square CU according to a shape of the non-square CU regarding whether the width of the non-square CU is larger or smaller than the height of the non-square CU. The palette coding is then applied to the non-square CU using the scan direction inferred. The scan direction can be inferred without signalling or parsing a flag. Alternatively, the flag can be explicitly signalled. If the width of the non-square CU is larger than the height of the non-square CU, the scan direction corresponds to a horizontal scan; and otherwise, the scan direction corresponds to a vertical scan. In the above examples, the horizontal and vertical directions can be swapped.

BRIEF DESCRIPTION OF THE DRAWINGS

FIG. 7A shows an example of the palette index map coding, where the horizontal scan order is assumed.

FIG. 7B illustrates an example of index map coding for the example in FIG. 7A.

FIG. 8 shows an example of separate luma and chroma palette coding corresponding to one embodiment of the present invention, where the chroma components share chroma palettes.

DETAILED DESCRIPTION OF THE INVENTION

Figure 1:
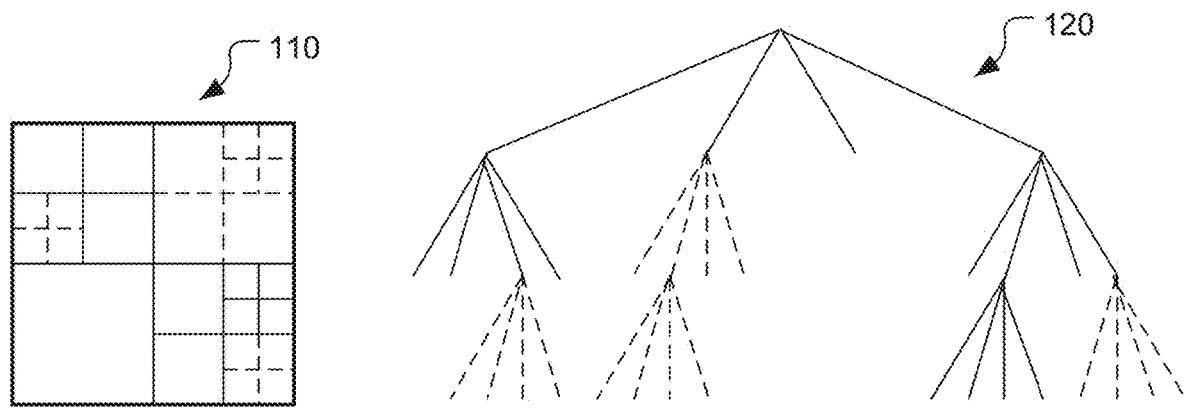
FIG. 1 illustrates an example of block partition using quadtree structure to partition a coding tree unit (CTU) into coding units (CUs).
Figure 2:
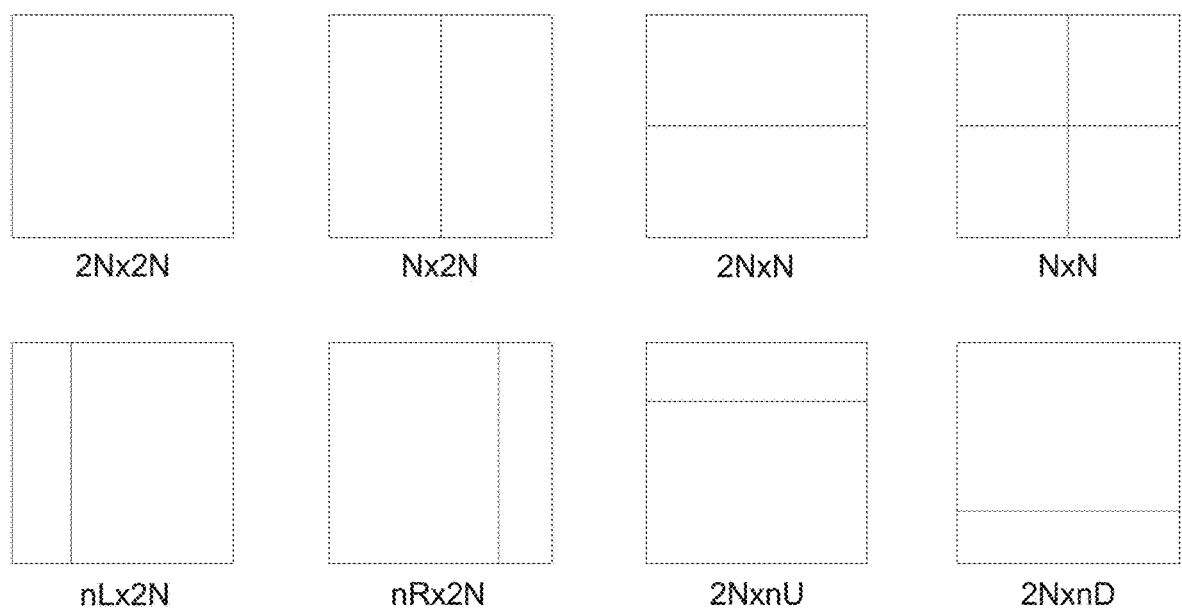
FIG. 2 illustrates asymmetric motion partition (AMP) according to High Efficiency Video Coding (HEVC), where the AMP defines eight shapes for splitting a CU into PU.
Figure 3:
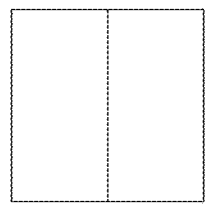
FIG. 3 illustrates an example of various binary splitting types used by a binary tree partitioning structure, where a block can be recursively split into two smaller blocks using the splitting types.
Figure 3:
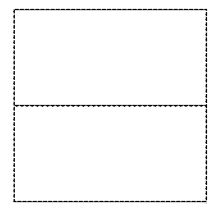
Figure 3:
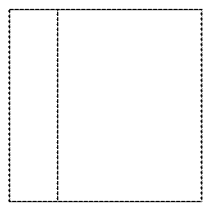
Figure 3:
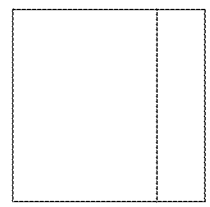
Figure 3:
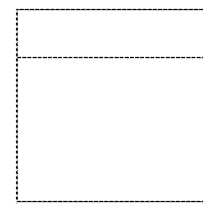
Figure 3:
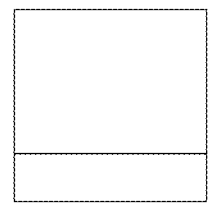
Figure 4:
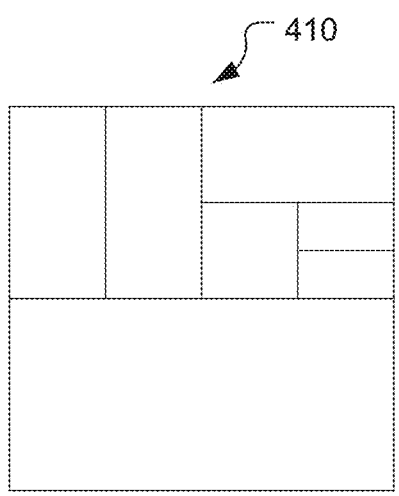
FIG. 4 illustrates an example of block partitioning and its corresponding binary tree, wherein each splitting node (i.e., non-leaf node) of the binary tree, one flag is used to indicate which splitting type (horizontal or vertical) is used, where 0 may indicate horizontal splitting and 1 may indicate vertical splitting.
Figure 4:
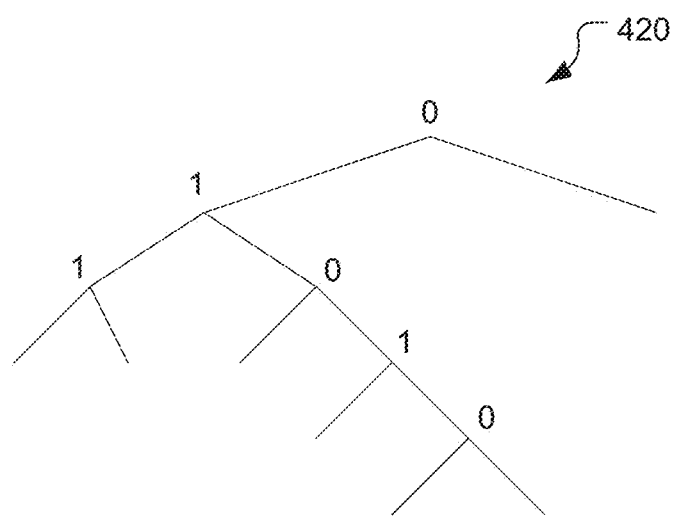
Figure 5:
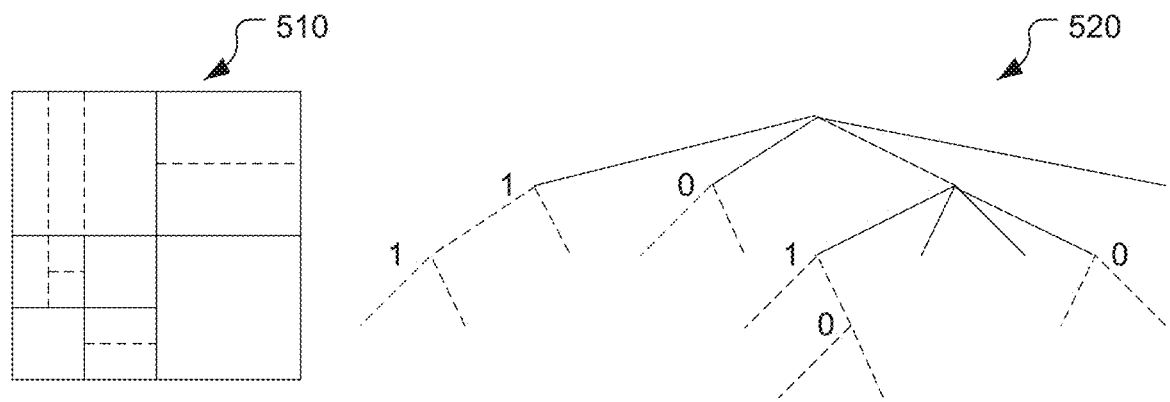
FIG. 5 illustrates an example of block partitioning and its corresponding quad-tree plus binary tree structure (QTBT), where the solid lines indicate quadtree splitting and dotted lines indicate binary tree splitting.
Figure 6:
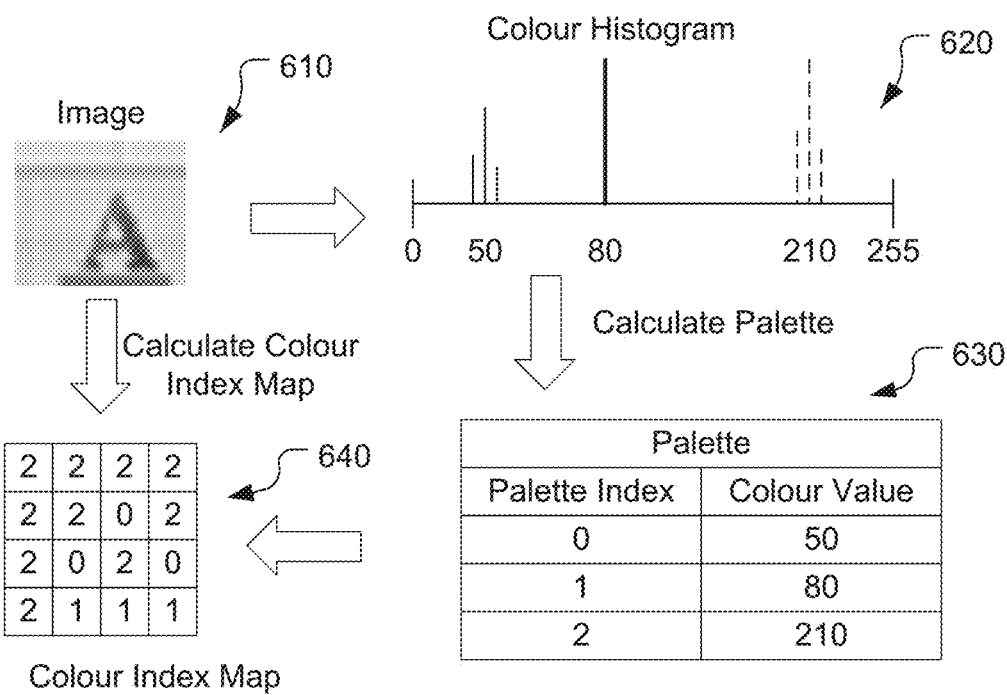
FIG. 6 shows an example of the palette mode operations, where the histogram of the image area is used to determine major colours, a palette is generated according to the major colours selected, and a colour index map is generated for the image area.

The following description is of the best-contemplated mode of carrying out the invention. This description is made for the purpose of illustrating the general principles of the invention and should not be taken in a limiting sense. The scope of the invention is best determined by reference to the appended claims.

According to the existing QTBT structure for video coding, the luma and chroma are coded separately for all Intra frames. However, in HEVC-SCC, the palette mode is designed for joint three colour components. Moreover, in HEVC-SCC, the CUs coded in the palette mode are always square CUs. However, when QTBT is applied, non-square CUs may be generated. In this invention, various methods are disclosed to address issues related applying palette mode to colour video comprising luma component and chroma components. The coding unit (CU) structure used to partition an image into blocks for coding comprises the QTBT, HEVC CU/PU/TU partition, as well as other block partition techniques in this disclosure.

Joint Colour Component Coding for Palette Mode

When the palette mode is enabled, the luma and chroma (or R/G/B) separate coding is disabled according to one embodiment of the present invention. In this case, the luma and chroma components will be coded jointly as the case for P- or B-slice. The use of palette mode can be indicated by a flag, such as palette_mode_enabled_flag being true in SPS, PPS (picture parameter set) or slice header.

In another embodiment, if the luma and chroma (or R/G/B) separate coding is applied, the palette mode is disabled. In other word, if the luma and chroma (or R/G/B)

separate coding is applied, the luma and chroma components will be coded using a coding mode selected from a group excluding the palette mode.

Separated Palette Coding for Luma and Chroma Components

When the luma and chroma components are coded separately, separate palette coding is used for luma and chroma components according to an embodiment of the present invention. For example, for luma component coding, the single component palette mode is used. One palette index or one major colour refers to a luma value. The luma palettes only contain values from a single colour component. For chroma components coding, the two-component palette mode is used. One palette index or one major colour refers to two chroma values. The chroma palettes contain two values from two colour components. The luma palettes and chroma palettes are independent. FIG. 8 shows an example of separate luma and chroma palette coding corresponding to this embodiment. The Y colour component 810 has an individual palette 840, and the U/V components (820 and 830) share another palette 850. Block 812 corresponds to a luma CU being coded. Blocks 822 and 832 correspond to a chroma U CU and a chroma V CU respectively being coded. For palette table 840, there are three entries and each index points to one luma colour value (y0, y1 or y2). For palette table 850, there are three entries and each index points to one pair of chroma colour values ((u0, v0), (u1, v1), or (u2, v2)).

Figure 9:
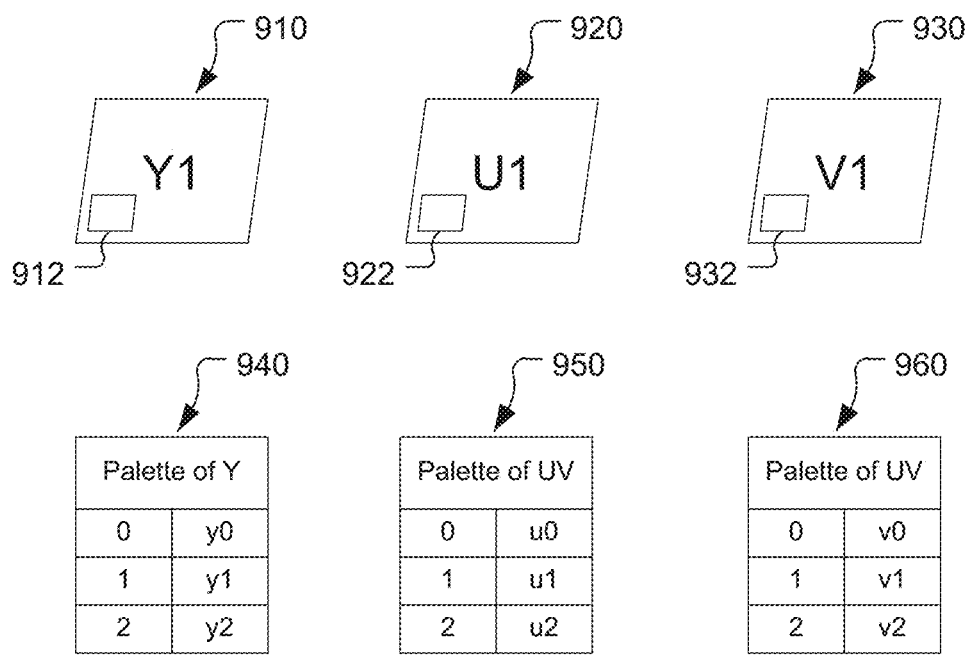
FIG. 9 shows an example of separate luma and chroma palette coding corresponding to one embodiment of the present invention, where the chroma components use individual chroma palettes.

In another embodiment, the U/V (or Cb/Cr) components are palette coded separately. FIG. 9 shows an example. Each colour component has an individual palette. The Y colour component 910 has an individual palette 940, and the U/V components (920 and 930) also use individual palettes 950 and 960 respectively. Block 912 corresponds to a luma CU being coded. Blocks 922 and 932 correspond to a chroma U CU and a chroma V CU respectively being coded. For palette table 940, there are three entries and each index points to one luma colour value (y0, y1 or y2). For palette table 950, there are three entries and each index points to chroma U values (u0, u1 or u2). For palette table 960, there are three entries and each index points to chroma V values (v0, v1 or v2).

Figure 10:
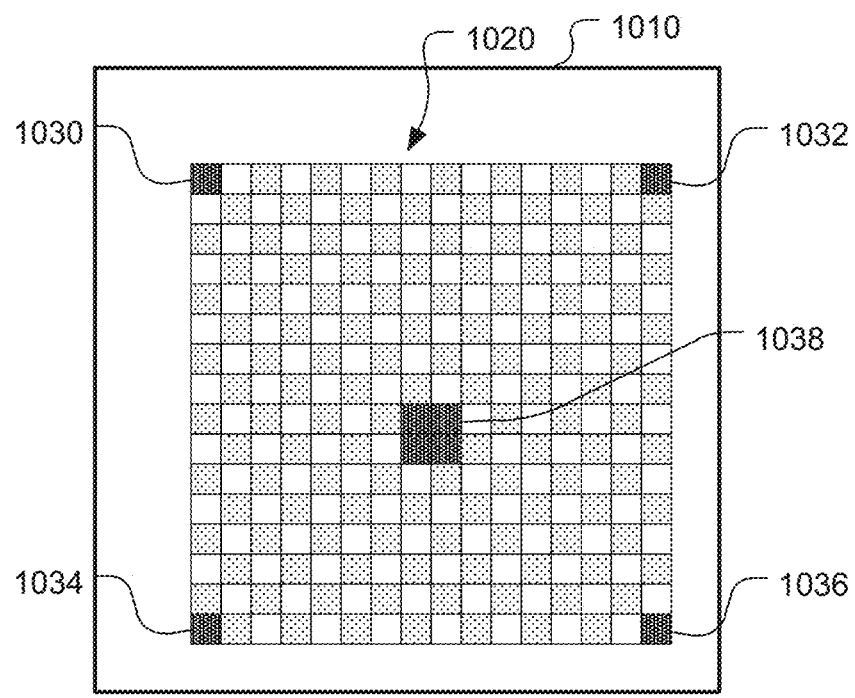
FIG. 10 illustrates an example of deriving the chroma palette mode flag for the target chroma CU based on a collocated luma CU.

When separate palette coding is applied to the luma and chroma components, the chroma palette coding may derive certain information from the luma component since the luma and chroma components usually are likely correlated. According to one embodiment, whether to use the palette coding for a target chroma block may be determined based on the collocated luma block (e.g., CU). Whether the target chroma block is coded in the palette mode can be indicated by the chroma_palette_mode flag. FIG. 10 illustrates an example of deriving the chroma_palette_mode flag for the target chroma CU based on a collocated luma CU. Area 1010 corresponds to a luma CTU. Block 1020 corresponds to a collocated luma CU, where the each small square corresponds to a 4×4 block (i.e., the minimum CU size). Blocks 1030, 1032, 1034 and 1036 correspond to four corner 4×4 blocks and blocks 1038 correspond to four middle 4×4 blocks. According to one embodiment, if the top-left 4×4 block of the collocated luma CU is coded in the palette mode, the current chroma block (referred as a target chroma block) is inferred as to be coded in the palette mode (i.e., chroma_palette_mode equal to 1). According to another embodiment, the four corner 4×4 blocks (i.e., top-left, top-right, bottom-left, bottom-right) of the collocated luma CU and four (or one) middle 4×4 luma blocks are checked. If any of them is coded using the palette mode, the current chroma block is inferred as being coded using the palette mode. Otherwise, the chroma_palette_mode flag is equal to 0 to indicate that the palette mode is not used for the chroma block.

The chroma_palette_mode flag can be signalled or parsed conditionally. According to one embodiment, if the top-left 4×4 block of the collocated luma CU is coded in the palette mode, the chroma_palette_mode is signalled for the current chroma block. According to another embodiment, the four corner 4×4 blocks (i.e., top-left, top-right, bottom-left, bottom-right) of the collocated luma CU and four (or one) middle 4×4 luma blocks are checked. If any of them is coded using the palette mode, the chroma_palette_mode is signalled for the current chroma block. Otherwise, the chroma_palette_mode flag is inferred as 0.

According to another embodiment, if the top-left 4×4 block of the collocated luma CU is coded in the palette mode, the chroma_palette_mode is inferred as to use the palette mode for the current chroma block (i.e., chroma_palette_mode equal to 1). According to another embodiment, the four corner 4×4 blocks (i.e., top-left, top-right, bottom-left, bottom-right) of the collocated luma CU and four (or one) middle 4×4 luma blocks are checked. If any of them is coded using the palette mode, the chroma_palette_mode is inferred as to use the palette mode for the current chroma block (i.e., chroma_palette_mode equal to 1). Otherwise, the chroma_palette_mode flag is signalled.

Initial Palette Predictor List

Initial palette predictor list sets up colour entries in the palette predictor list at the beginning of a slice, wavefront, and tiles. They serve as the initial predictors for palette coded CUs. Two methods are disclosed in the present invention:

A. Initial Palette Predictor List with Joint Colour Component

In this method, the initial palette predictor list for the I-slice has the same structure as PB-slices, i.e., using a joint colour component palette (e.g. each entry with three components). When separate luma and chroma coding is used for the I-slice, for a luma (e.g. Y) block coded with the palette mode, the corresponding luma component from the colour entry in the initial palette is used as palette predictor. For a chroma block coded with the palette mode, the corresponding two components values from the colour entry in the initial palette list are used as palette predictor if U and V are coded jointly under QTBT or other CU structure. On the other hand, the corresponding value of each component from the initial palette predictor list is used respectively if U and V are coded separately under QTBT or other CU structure.

B. Separate Initial Palette Predictor List

In this method, for I-slice with separate luma and chroma coding, separate initial palette predictor list are utilized. One initial palette predictor list contains only the luma values (Y-component initial palette predictor list), which is used for a luma block coded with palette mode. If U and V are coded jointly using QTBT or other CU structure, another initial palette predictor list containing two-component colour entries is used, which is for a chroma (U+V) block coded with palette mode. If U and V are coded separately under using QTBT or other CU structure, two initial palette predictor lists are used, each containing only the U and the V component values. They are used for a U block or V block coded with palette mode.

Shared Palette Index Map Coding

In separate luma and chroma coding, the separate palette coding in FIG. 8 or FIG. 9 can be used. According to one embodiment of the present invention, the luma index map coding result is shared by the chroma index map coding. For example, when coding a chroma CU, if the collocated luma CU is also coded in the palette mode, the luma index map can be reused. For example, the palette_transpose_flag and the palette_escape_val_present flag can be shared. The copy_above_palette_indices_flag, which can be used to derive whether the copy_above or index_run mode is used for a sample, can also be shared. If the copy_above_palette_indices_flag of luma component is shared for the chroma component, the copy_above_palette_indices_flag and palette_run are skipped. In this case, only the palette_index_idc is required to be signalled for each index_run_mode palette run. The num_palette_indices_minus1 and copy_above_indices_for_final_run_flag are also skipped and copied from the luma component.

In one embodiment, a share_plt_coding_flag is signalled to indicate whether the palette coding of chroma CU may share the information from the collocated luma CU.

In another embodiment, identify the chroma CU's first N×N sub-block (for example, the first in raster scan order within this chroma CU), whose corresponding collocated luma block belongs to a palette coded CU. The above mentioned palette index map coding information of this luma CU is shared when coding of the chroma CU in palette mode.

In yet another embodiment, when the palette coding of chroma CU may share the information from some palette coded luma CUs, a candidate list of such luma CUs is established with an index signalled to indicate which luma CU is selected to share the associated information.

In yet another embodiment, if the luma block is coded in the palette_mode, the collocated chroma block can be predicted from the luma block in a way similar to the LM mode in HEVC.

According to another embodiment, parameters a and b can be derived or signalled, where the chroma_pred_sample=a*collocated_luma_rec_sample+b or chroma_pred_sample=a*collocated_luma_pred_sample+b.

Shared Palette Coded Samples

In luma and chroma separate coding, the three-component palette coding mode in HEVC-SCC can be used for the luma component coding. In this case, only the luma component of the decoded palette will be used to reconstruct the luma CU. When coding/decoding a chroma CU, if its collocated luma CU is coded in three-component palette mode, the chroma reconstructed samples from the three-component palette coding mode can be used for coding/decoding the chroma CU. An explicitly signalled or derived flag can be used to indicate whether to reuse the reconstructed chroma samples from the three-component palette coding mode.

Different Scan Direction for Non-Square CU

In HEVC-SCC, the CU shape is always square. The horizontal and vertical traverse scans are applied for a CU. A palette_transpose_flag is signalled to indicate the scan direction. In QTBT or other CU structures, the non-square CU may be produced and therefore the CU can be square as well as non-square. For a square-shaped CU coded in the palette mode, the scan direction is still signalled. For a non-square CU, the scan direction can be inferred. For example, for a non-square CU with the CU width larger than the CU_height, the vertical scan is used. Otherwise (i.e., the CU width smaller than the CU_height), the horizontal scan is used. In other words, the scan direction is dependent on whether the CU width is larger or smaller than the CU_height. In another embodiment, for a non-square CU with the CU width is larger than the CU_height, the horizontal scan is used. Otherwise (i.e., the CU_width smaller than the CU_height), the vertical scan is used. In another embodiment, the palette_transpose_flag is signalled for a non-square CU. If the CU_width is larger than the CU_height, the palette_transpose_flag is set to 0 to indicate a horizontal scan or is set to 1 to indicate for vertical scan. Otherwise (i.e., the CU_width being smaller than the CU_height), the palette_transpose_flag is signalled to 1 to indicate a horizontal scan or is set to 0 to indicate for vertical scan.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 11:
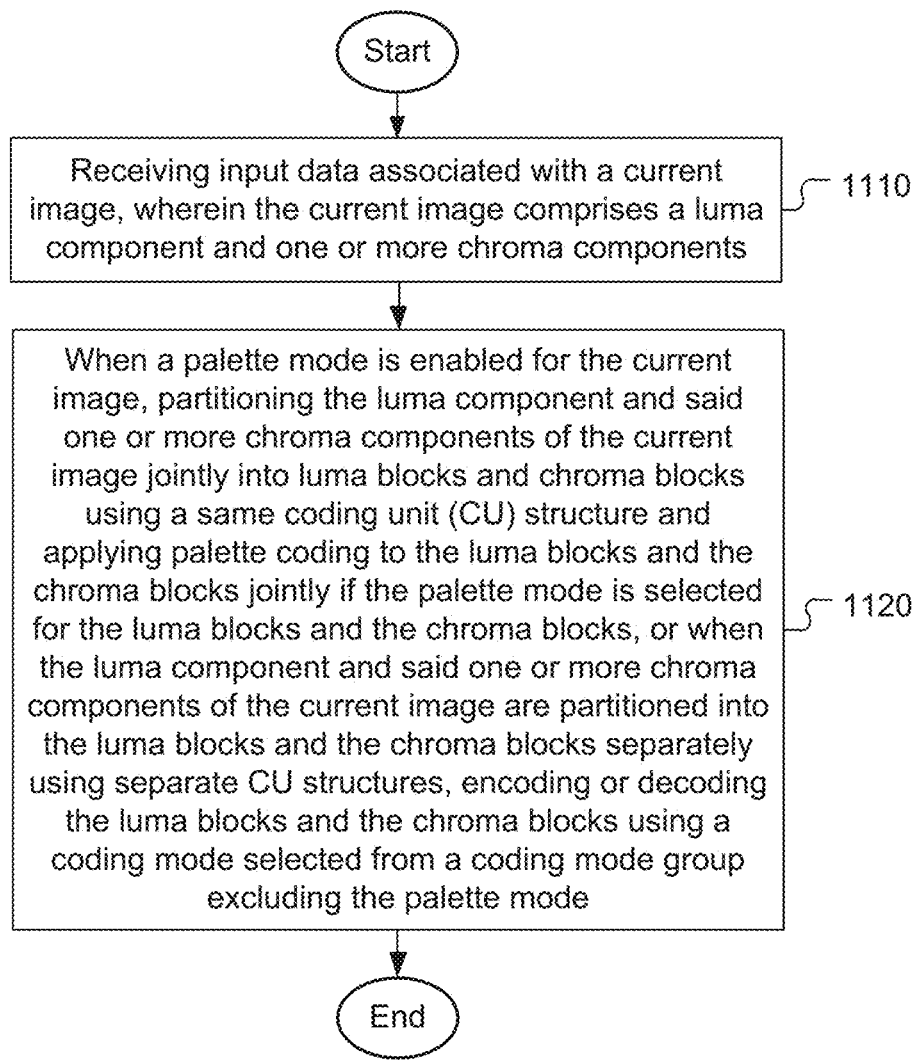
FIG. 11 illustrates a flowchart of an exemplary coding system using palette mode coding for video data with colour components according to an embodiment of the present invention, where when the palette mode is enabled, separate coding of luma and chroma components is disabled or if separate coding of luma and chroma components, the palette mode is disabled.

FIG. 11 illustrates a flowchart of an exemplary coding system using palette mode coding for video data with colour components according to an embodiment of the present invention, where when the palette mode is enabled, separate coding of luma and chroma components is disabled or if separate coding of luma and chroma components, the palette mode is disabled. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with an image area in a current image are received in step 1110, where the current image comprises a luma component and one or more chroma components. At the encoder side, the input data may correspond to video data to be encoded. At the decoder side, the input data may correspond to compressed video data to be decoded. In step 1120, when a palette mode is enabled for the current image, the luma component and said one or more chroma components of the current image are partitioned jointly into luma blocks and chroma blocks using a same coding unit (CU) structure and the palette coding is applied to the luma blocks and the chroma blocks jointly if the palette mode is selected for the luma blocks and the chroma blocks, or when the luma component and said one or more chroma components of the current image are partitioned into the luma blocks and the chroma blocks separately using separate CU structures, the luma blocks and the chroma blocks are encoded or decoded using a coding mode selected from a coding mode group excluding the palette mode.

Figure 12:
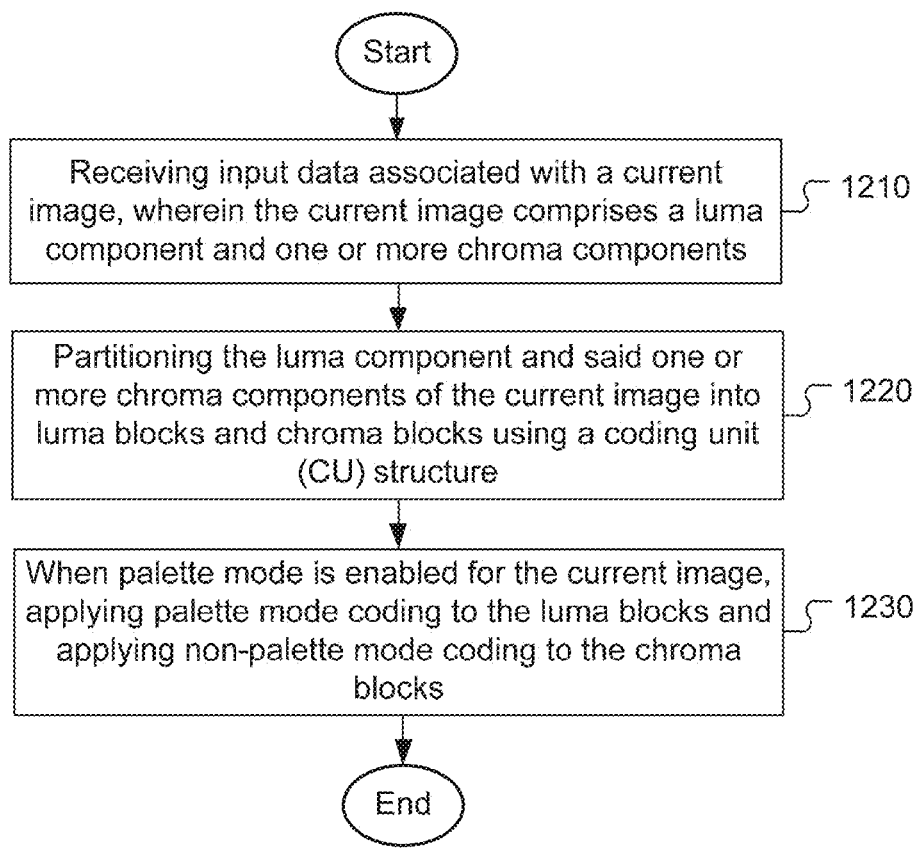
FIG. 12 illustrates a flowchart of an exemplary coding system using palette mode coding for video data with colour components according to an embodiment of the present invention, where when the palette mode is enabled for the current image, palette mode coding is only applied to the luma blocks and non-palette mode coding is applied to the chroma blocks.

FIG. 12 illustrates a flowchart of an exemplary coding system using palette mode coding for video data with colour components according to an embodiment of the present invention, where when the palette mode is enabled for the current image, palette mode coding is only applied to the luma blocks and non-palette mode coding is applied to the chroma blocks. According to this method, input data associated with an image area in a current image are received in step 1210, where the current image comprises a luma component and one or more chroma components. The luma component and said one or more chroma components of the current image are partitioned into luma blocks and chroma blocks using a coding unit (CU) structure in step 1220.

When palette mode is enabled for the current image, the palette mode coding is applied to the luma blocks and applying non-palette mode coding to the chroma blocks in step 1230.

Figure 13:
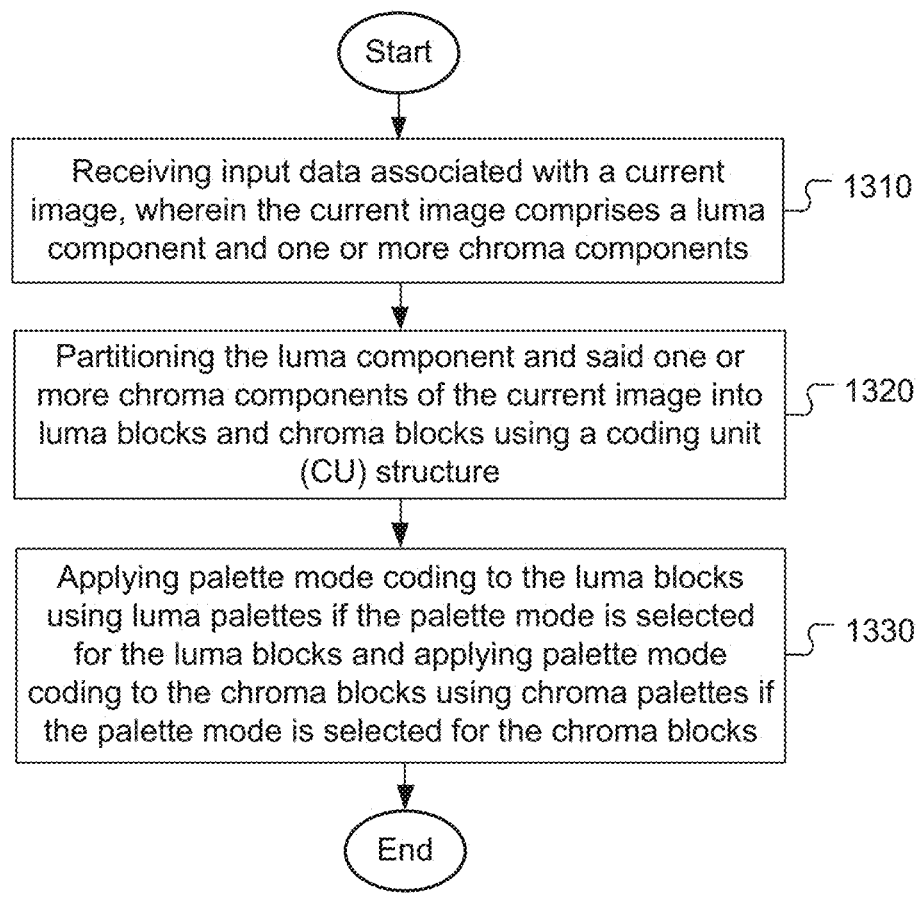
FIG. 13 illustrates a flowchart of an exemplary coding system using palette mode coding for video data with colour components according to an embodiment of the present invention, where palette mode coding is applied to the luma blocks using luma palettes if the palette mode is selected for the luma blocks and palette mode coding applying to the chroma blocks using chroma palettes if the palette mode is selected for the chroma blocks.

FIG. 13 illustrates a flowchart of an exemplary coding system using palette mode coding for video data with colour components according to an embodiment of the present invention, where palette mode coding is applied to the luma blocks using luma palettes if the palette mode is selected for the luma blocks and palette mode coding applying to the chroma blocks using chroma palettes if the palette mode is selected for the chroma blocks. According to this method, input data associated with an image area in a current image are received in step 1310, where the current image comprises a luma component and one or more chroma components. The luma component and said one or more chroma components of the current image are partitioned separately into luma blocks and chroma blocks using separate coding unit (CU) structures in step 1320. Palette mode coding is applied to the luma blocks using luma palettes if the palette mode is selected for the luma blocks and palette mode coding is applied to the chroma blocks using chroma palettes if the palette mode is selected for the chroma blocks in step 1330.

Figure 14:
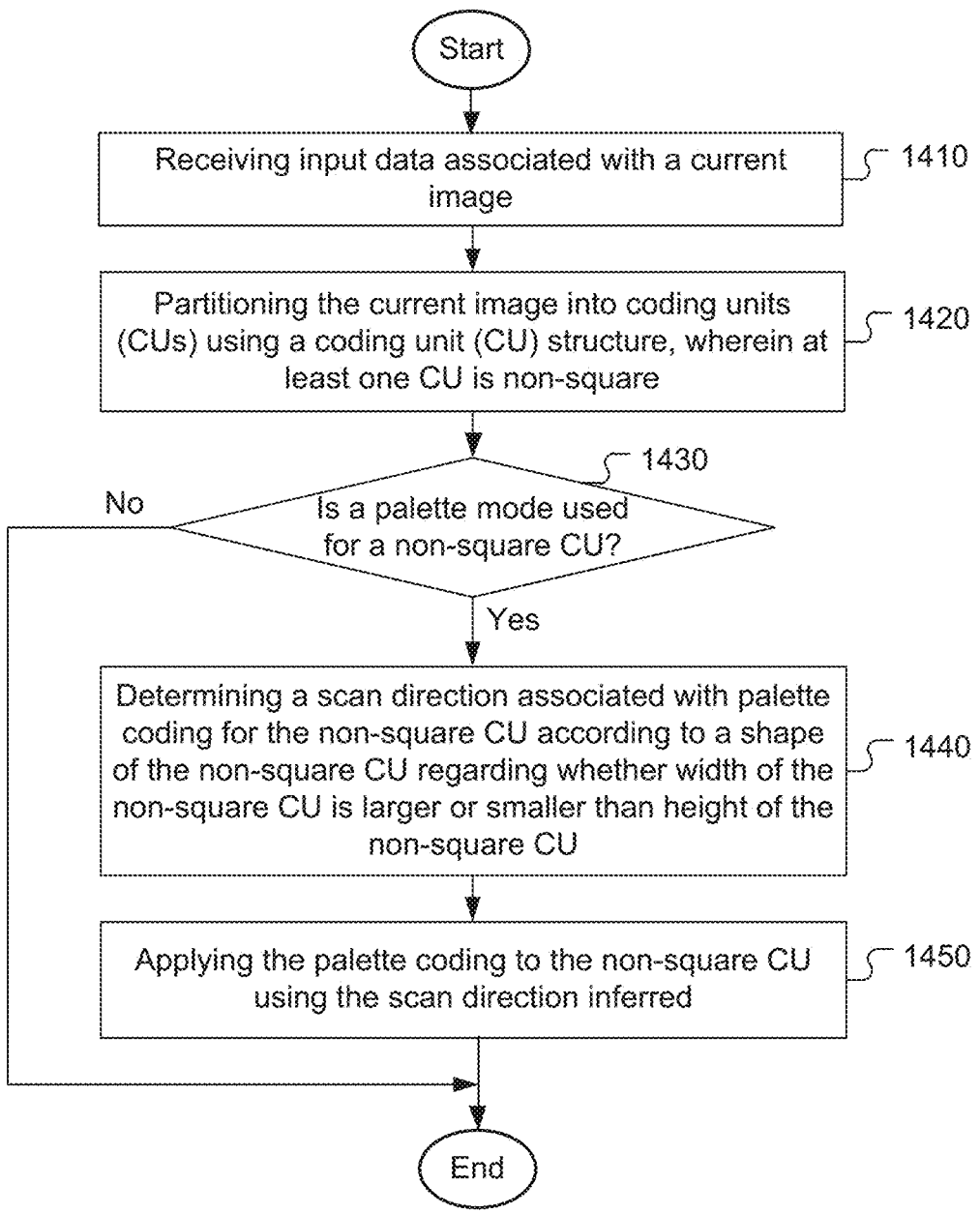
FIG. 14 illustrates a flowchart of an exemplary coding system using palette mode coding for video data with colour components according to an embodiment of the present invention, where if a palette mode is used for a non-square CU, a scan direction associated with palette coding is determined for the non-square CU according to a shape of the non-square CU regarding whether width of the non-square CU is larger or smaller than height of the non-square CU.

FIG. 14 illustrates a flowchart of an exemplary coding system using palette mode coding for video data with colour components according to an embodiment of the present invention, where if a palette mode is used for a non-square CU, a scan direction associated with palette coding is determined for the non-square CU according to a shape of the non-square CU regarding whether width of the non-square CU is larger or smaller than height of the non-square CU. According to this method, input data associated with an image area in a current image are received in step 1410. The current image is partitioned into coding units (CUs) using a coding unit (CU) structure in step 1420, where at least one CU is non-square. Whether a palette mode is used for a non-square CU is check in step 1430. If the palette mode is used for the non-square CU (i.e., the "Yes" path from step 1430), steps 1440 and 1450 are performed. Otherwise (i.e., the "No" path from step 1430), steps 1440 and 1450 are skipped. In step 1440, a scan direction associated with palette coding is determined for the non-square CU according to a shape of the non-square CU regarding whether the width of the non-square CU is larger or smaller than the height of the non-square CU. In step 1450, the palette coding is applied to the non-square CU using the scan direction inferred.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding and decoding used by a video encoding system and video decoding system respectively, the method comprising:
   receiving input data associated with a current image, wherein the current image comprises a luma component and one or more chroma components;
   partitioning the luma component and said one or more chroma components of the current image separately into luma blocks and chroma blocks using separate coding unit (CU) structures; and
   applying palette mode coding to the luma blocks using luma palettes if the palette mode is selected for the luma blocks and applying palette mode coding to the chroma blocks using chroma palettes if the palette mode is selected for the chroma blocks,
   wherein when a chroma block is coded using direct mode (DM) and a corresponding luma block is coded in the palette mode, a pre-defined Intra mode is used to code the chroma block, and wherein the pre-defined Intra mode corresponds to a DC mode or a planar mode.

2. The method of claim 1, wherein an initial palette predictor list is generated at a beginning of a slice, wavefront, or tiles, and wherein the initial palette predictor list is used as initial predictors for the luma blocks or chroma blocks coded in the palette mode.

3. The method of claim 2, wherein the initial palette predictor list uses a joint colour component palette, and wherein the luma blocks or chroma blocks coded in the palette mode use corresponding luma component or corresponding one or more chroma components from colour entries of the initial palette predictor list as respective palette predictors.

4. The method of claim 2, wherein the initial palette predictor list uses separate initial luma palette for the luma blocks coded in the palette mode and one or more initial chroma palettes for the chroma blocks coded in the palette mode.

5. The method of claim 4, wherein said one or more chroma components correspond to a U component and a V component, and wherein the chroma blocks for the U component and the chroma blocks for the V component either share a joint initial chroma palette or use separate initial chroma palettes.

6. The method of claim 1, wherein said one or more chroma components consist of a first chroma component and a second chroma component, each chroma palette consists of entries from the first chroma component and the second chroma component, and the chroma blocks associated with the first chroma component and the second chroma component coded in the palette mode use same chroma palettes.

7. The method of claim 1, wherein said one or more chroma components consist of a first chroma component and a second chroma component; the chroma blocks consist of first chroma blocks and second chroma blocks corresponding to the first chroma component and the second chroma component respectively; the chroma palettes consist of first chroma palettes and second chroma palettes corresponding to the first chroma component and the second chroma component respectively; and the first chroma blocks coded in the palette mode use the first chroma palettes and the second chroma blocks coded in the palette mode use the second chroma palettes.

8. The method of claim 1, wherein whether a target chroma block is coded using the palette mode is determined according to whether a collocated luma block is coded by the palette mode.

9. The method of claim 8, wherein each luma block corresponds to a luma coding unit (CU) and each chroma block corresponds to a chroma CU.

10. The method of claim 8, wherein if any of four corner 4×4 blocks and four middle 4×4 blocks of the collocated luma block is coded by the palette mode, the target chroma block is coded by the palette mode and otherwise, the target chroma block is not coded by the palette mode.

11. The method of claim 1, wherein whether a target chroma block is coded using the palette mode is indicated by signalling in an encoder side or parsing in a decoder side a chroma palette mode syntax.

12. The method of claim 11, wherein whether the chroma palette mode syntax for the target chroma block is signalled or parsed conditionally depending on whether a collocated luma block is coded by the palette mode.

13. The method of claim 12, wherein if a top-left 4×4 block of the collocated luma block is coded by the palette mode, the chroma palette mode syntax is signalled or parsed and otherwise the chroma palette mode syntax is not signalled or parsed; or if any of four corner 4×4 blocks and four middle 4×4 blocks of the collocated luma block is coded by the palette mode, the chroma palette mode syntax is signalled or parsed and otherwise the chroma palette mode syntax is not signalled or parsed.

14. The method of claim 12, wherein if a top-left 4×4 block of the collocated luma block is coded by the palette mode, the chroma palette mode syntax is inferred as using the palette mode and otherwise the chroma palette mode syntax is signalled or parsed; or if any of four corner 4×4 blocks and four middle 4×4 blocks of the collocated luma block is coded by the palette mode, the chroma palette mode syntax is inferred as using the palette mode and otherwise the chroma palette mode syntax is signalled or parsed.

15. The method of claim 1, wherein when a target chroma block is coded using the palette mode and a collocated luma block is also coded using the palette mode, palette scan direction of the chroma block is inherited from the palette scan direction of the collocated luma block.

16. A method of video encoding and decoding used by a video encoding system and video decoding system respectively, the method comprising:
receiving input data associated with a current image, wherein the current image comprises a luma component and one or more chroma components;
partitioning the luma component and said one or more chroma components of the current image separately into luma blocks and chroma blocks using separate coding unit (CU) structures; and
applying palette mode coding to the luma blocks using luma palettes if the palette mode is selected for the luma blocks and applying palette mode coding to the chroma blocks using chroma palettes if the palette mode is selected for the chroma blocks,
wherein whether a target chroma block is coded using the palette mode is determined according to whether a collocated luma block is coded by the palette mode, and
wherein if a top-left 4×4 block of the collocated luma block is coded by the palette mode, the target chroma block is coded by the palette mode and otherwise, the target chroma block is not coded by the palette mode.

17. An apparatus of video encoding and decoding used by a video encoding system and video decoding system respectively, the apparatus comprising one or more electronic circuits or processors arrange to:
receive input data associated with a current image, wherein the current image comprises a luma component and one or more chroma components;
partition the luma component and said one or more chroma components of the current image separately into luma blocks and chroma blocks using separate coding unit (CU) structures; and
apply palette mode coding to the luma blocks using luma palettes if the palette mode is selected for the luma blocks and apply palette mode coding to the chroma blocks using chroma palettes if the palette mode is selected for the chroma blocks,
wherein when a chroma block is coded using direct mode (DM) and a corresponding luma block is coded in the palette mode, a pre-defined Intra mode is used to code the chroma block, and wherein the pre-defined Intra mode corresponds to a DC mode or a planar mode.

* * * * *